Aug. 8, 1950          A. BESAG          2,518,274

VACUUM CUP MOUNTING FOR FRUIT PITTING MACHINES

Filed Nov. 14, 1946          4 Sheets-Sheet 1

INVENTOR
ARNOLD BESAG

BY

Richards & Geier
ATTORNEYS

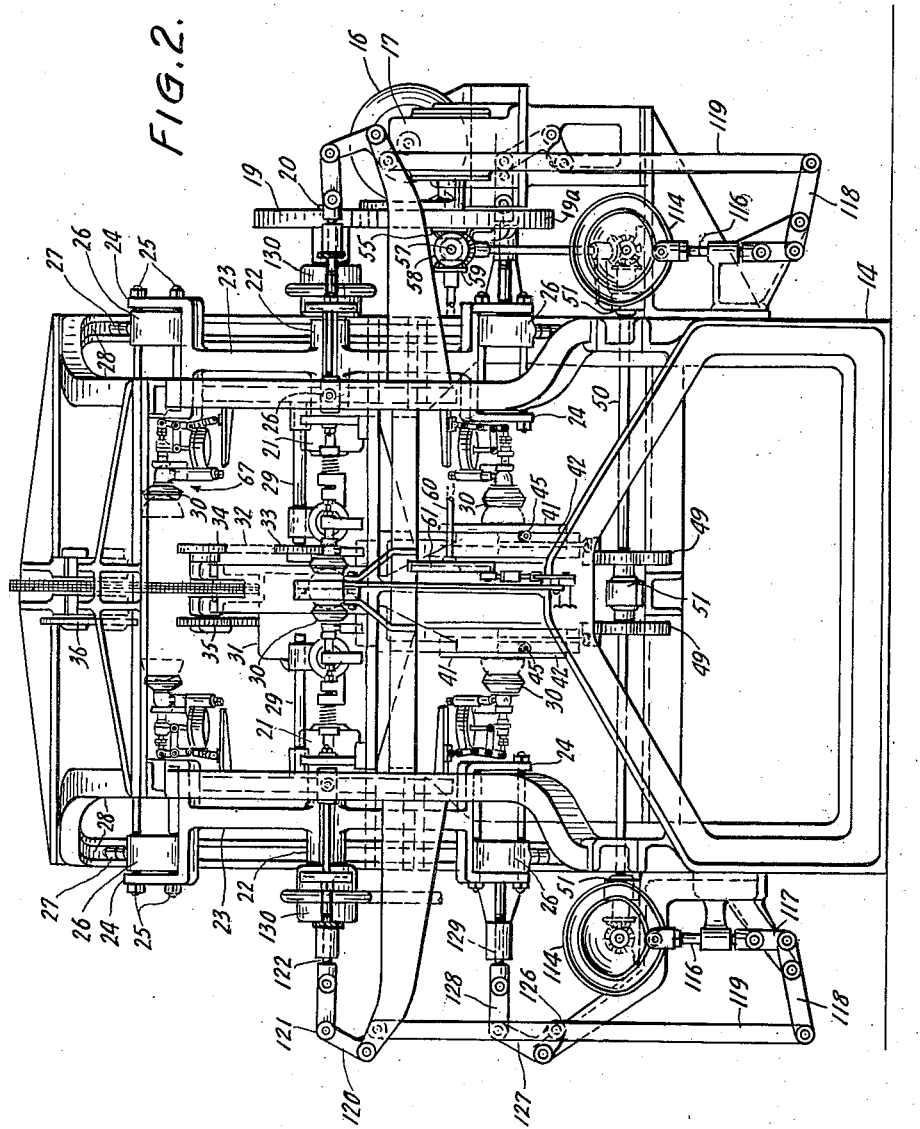

INVENTOR
ARNOLD BESAG
BY
Richards & Geier
ATTORNEYS

Aug. 8, 1950      A. BESAG      2,518,274
VACUUM CUP MOUNTING FOR FRUIT PITTING MACHINES
Filed Nov. 14, 1946      4 Sheets-Sheet 4
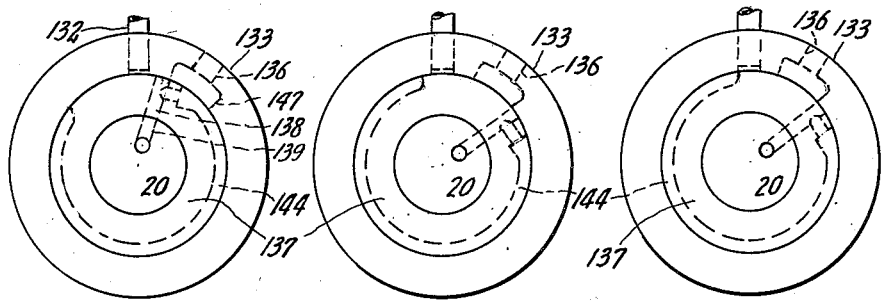
FIG.6.      FIG.7.      FIG.8.
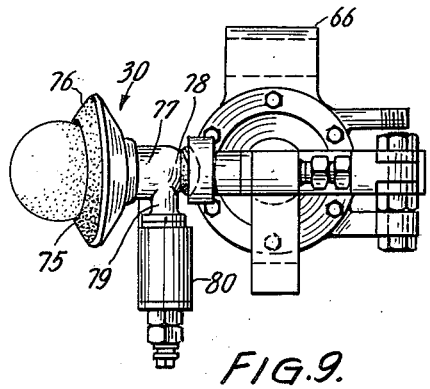 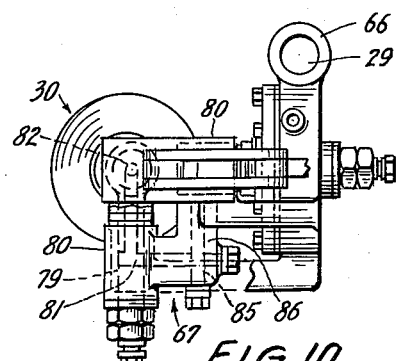
FIG.9.      FIG.10.
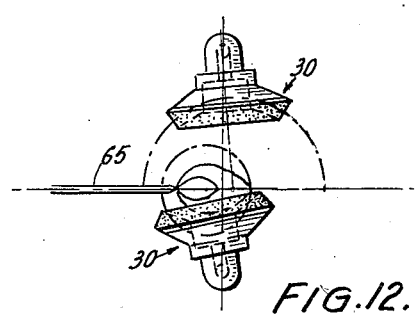 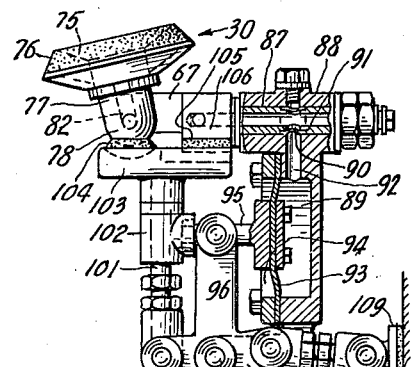
FIG.12.
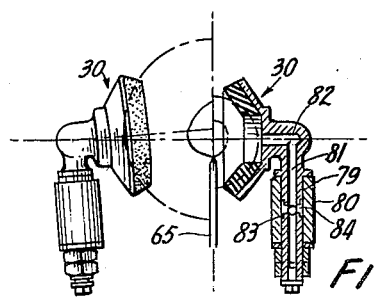
FIG.13.      FIG.11.
INVENTOR
ARNOLD BESAG
BY
Richards & Geier
ATTORNEYS Patented Aug. 8, 1950

2,518,274

UNITED STATES PATENT OFFICE 2,518,274

VACUUM CUP MOUNTING FOR FRUIT PITTING MACHINES

Arnold Besag, East Malvern, Victoria, Australia

Application November 14, 1946, Serial No. 709,713
In Australia November 16, 1945

2 Claims. (Cl. 146—28)

This invention relates to suction cups and suction means of machines for pitting fruits such as peaches or the like.

In the usual designs of peach pitting machines, the fruit after being manually positioned on a conveyor, e. g. on impaling blades with the suture of the fruit located in the same plane as the impaling blades, the fruit is then carried by metal cups to fruit halving mechanism and slidably moved along a metal plate by the cups to pit locating and removing devices.

Applicant believes that such metal cups do not hold various sizes of fruit firmly, and the fruit when halved will have a natural tendency to move in the cup while the fruit is slidably moved along the metal plate. This movement is most likely to occur when the pit is unevenly cut, which is frequent, as the pit may crack in some natural plane under the impact of the fruit halving mechanism.

Such possibility of movement of the fruit makes it necessary to provide pit locating mechanism to adjust the pitting means accordingly.

The principal objective of the present invention is to provide in fruit pitting machines means for holding the fruit in a predetermined position and retaining such position during subsequent processing operations whereby the use of pit locating mechanisms may be avoided.

With the above stated objective in view, a fruit pitting machine, according to this invention is provided with at least one suction cup mounted for angular movements to engage fruit at a pick-up position and effect self-adjusting holding engagement with said fruit, and automatically operable means for maintaining the cup in self-adjusted position during transit and subsequent processing operations upon the fruit.

In a preferred embodiment there is at least one pair of co-acting suction cups mounted for guided axial movement towards each other to engage a fruit at a pick-up position, each cup mounted for angular movements to effect a self-adjusting holding engagement with the fruit, and automatically operable means for maintaining each cup in self-adjusted position during transit and subsequent processing operations upon the fruit.

In operation, with the natural suture of the fruit located normal to the axis of the cup mounting, the latter is axially advanced relatively to the fruit and upon contacting the surface of the latter, the cup may describe any limited angular movement necessary to ensure that the suction exerting face of the cup seats flush with the contoured surface of the fruit.

Said face may be of concave form to ensure such flush engagement and said means automatically operate to lock the suction cup in the self-adjusted position, whereby the fruit is firmly held by the cup in the one position, during transfer movement of the cup to and at subsequent processing stations at which the fruit may be halved and then pitted.

Fig. 2 is a view in front elevation and—

Figs. 6, 7 and 8 are diagrammatic views illustrating the operation of the valvular means illustrated by Figs. 4 and 5.

Fig. 9 is a front elevation of one of the suction cups and associated locking mechanism.

Fig. 10 is a side elevation of the suction cup illustrated in Fig. 9 and—

Fig. 11 is a plan view, partly in section, of the suction cup shown in Figs. 9 and 10.

Figs. 12 and 13 are diagrammatic views illustrative of the action of the suction cups in holding peaches differing in size.

Figure 1:
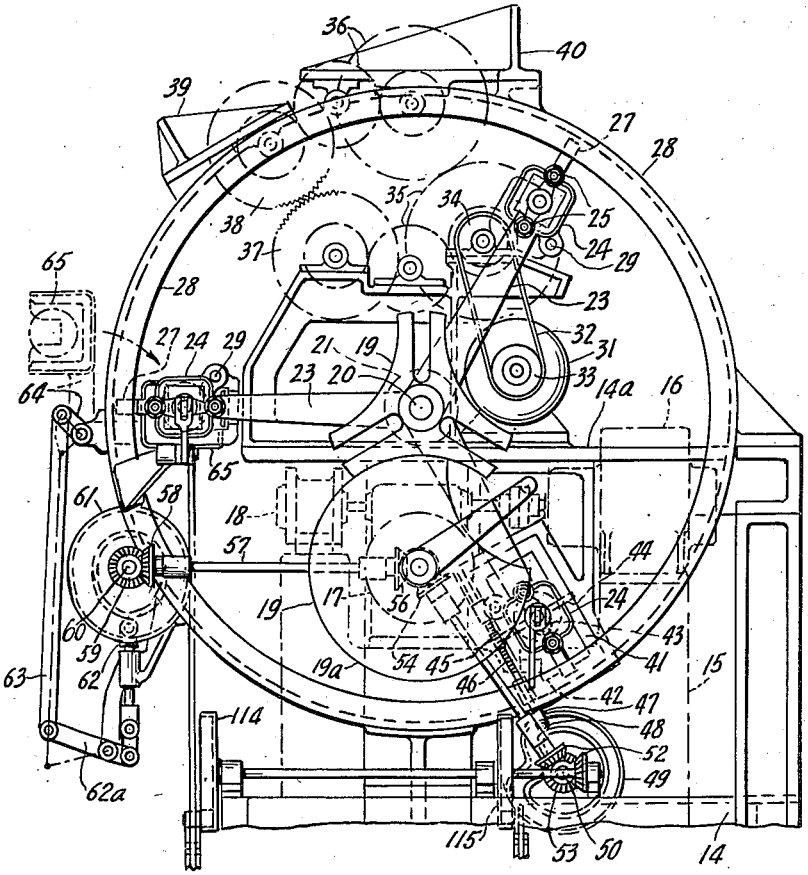
Fig. 1 is a side elevation of a peach pitting machine.
Figure 4:
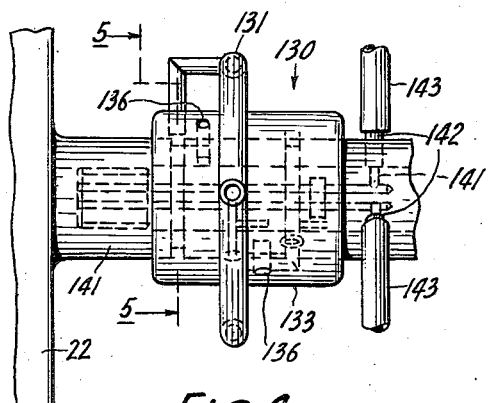
Fig. 4 is a detail view of the valvular means in accordance with the present invention for controlling the operation of the suction cups and—

In the drawings 14 designates generally the main frame of the machine to which is secured a bracket 15 carrying main driving motor 16 coupled through reduction gear box 17 to vacuum pump 18 and through the gear box 17 and Geneva drive 19 to main shaft 20 carried in bearings 21.

Fixed to the main shaft 20 are two spaced three armed spiders 22, the arms 23 of which latter are provided with forked ends 24.

Bridging the forked ends 24 are two spaced guide bars 25 along which latter a carriage 26 is arranged to move. The carriage 26 carries a roller 27 engaging a cam track 28 fixed to the main frame 14. The carriage 26 together with rod 29 secured on and projecting from the forked end 24 of spider arm 23 carry the suction cup 30 and operative mechanism therefor to be hereinafter described.

The portion 14a of the main frame 14 supports an electric motor 31 which is drive coupled through belt 32 and belt pulleys 33 and 34 to gear trains 35 and 36 driving circular co-operating peach halving saws 37 and 38. The gear train 36 and saw 38 are supported on frame members 39 and 40 attached to and bridging the cam tracks 28.

Positioned below portion 14a of main frame 14 are two spaced and aligned pitting tables 41 which have secured therein frames 42 having mounted therein oscillatable pitting knives 43 of any suitable construction.

Each pitting knife 43 is mounted on a shaft 44 rotated by pinion 45 which latter meshes with rack 46. The rack 46 is carried on a rod 47, one end of which latter has a roller 48 engaging a cam 49. Each cam 49 is carried on shaft 50 supported in bearings 51. The shaft 50 is drive coupled through bevel gears 52 and 53 and 54 and 55, the bevel 55 being connected to the constantly rotating shaft of the wheel 19a of the Geneva drive 19.

Also meshed with the bevel gear 55 is a bevel gear 56 mounted on shaft 57. Mounted on the other end of shaft 57 is a bevel gear 58 with which is engaged a bevel gear 59 mounted on shaft 60 carrying a cam 61 operating a guided push rod 62 connected by a link 63 to one end of a bell crank lever 64. The other end of the bell crank lever 64 carries a forked impaling blade 65 arranged under the action of the cam 61 to assume a position where a peach can be located by an operator in the impaling blade 65 and to be moved to a position for the peach to be picked up by the suction cups 30.

It is important that the fruit should be placed within the impaling blade 65 with the suture plane of the former coincident with the plane of the latter.

Accordingly, the operator places each fruit within the impaling blade with the suture plane in coincidence with the plane of the blade and thrusts the fruit downwardly and forwardly, thereby causing the lower and upright edges of the blade to cut into the fruit and contact the stone which is resultantly properly located for subsequent removal by the pitting knife independently of the shape and size of the fruit.

Upon the fruit being thus positioned, the impaling blade 65 is actuated to transfer the fruit to the pick up position wherein the fruit is engaged by the suction cups and carried thereby to the saws 37 and 38 and subsequently to the pitting station.

The suction cups 30, co-operate in opposed pairs, but for the purposes of description one suction cup mounting and co-operative parts will now be described.

As previously described the carriage 26 is slidable upon guide bars 25 under the action of cam engaging roller 27. Slidably mounted in carriage 26 is a rod 66 which at the inner end thereof is connected to the assembly 67 of the suction cup 30.

The assembly 67 has a boss 68 slidable on the rod 29 previously referred to for supporting said mounting and suction cup. Slidable through the carriage 26 are parallel rods 69 which at the outer ends are secured to cross head 70. The inner ends of the rods 69 are attached to a plate 71 slidably mounted on rod 66. Secured to rod 29 is a stop plate 72 through which the parallel rods 69 are free to slide.

Interposed between the outer end of rod 66 and the inner face of the cross head 70 is a compression spring 73. A further spring 74 is interposed between the plate 71 and the cup assembly 67.

The suction cup 30 comprises a flared mouth 75 having a rubber or like resilient sealing lining 76. Extending axially from the cup 30 is a hollow boss 77, having a hemi-spherical end 78. Extending at right angles from the boss 77 is a hollow stem 79. The stem 79 is rotatably mounted in a sleeve 80 formed in the cup mounting 67. The passage 81 in hollow stem 79 is in communication with passage 82 formed in hemi-spherical boss 78. The passage 82 communicates with the interior of the cup mouth 75.

A groove 83 is formed in the stem 79 and ports 84 connect said groove 83 with the passage 81 in said stem. The groove 83 is in continuous communication with a duct 85 provided in an elbow 86 formed integrally with sleeve 80 and having a stem 87 fitted and rotatable in a sleeve 88. Sleeve 88 is formed integrally with a chamber 89.

The duct 85 communicates through ports 90 and groove 91 in stem 87 and passage 92 with the closed chamber 89. The axes of the stem 79 and stem 87 of elbow 86 intersect at the centre of the hemi-spherical boss 78 whereby it will be apparent that the suction cup 30 can rotate in a substantially horizontal plane about the axis of the stem 79 and also in a vertical plane about the axis of the stem 87.

One wall of chamber 89 consists of a flexible diaphragm 93 secured in position by a clamping ring 94. The diaphragm stem 95 is pivotally connected to arm 96 of a three armed lever 97, pivoted at 98 on a bracket 99 formed on chamber 89.

One arm 100 is pivotally connected to an adjustable push rod 101 supported in guide 102. The other end of push rod 101 is connected to a brake head 103. A brake shoe 104 is positioned on the head 103 to engage the hemi-spherical boss 78 and brake shoe 105 is arranged to engage cylindrical portion 106 formed on elbow 86.

Toggle arm 107 of three armed lever 97 is pivotally connected to adjustable toggle arm 108 carrying a brake shoe 109 arranged to contact an abutment 110 formed on a bracket 111 extending from the carriage 26.

At end of shaft 50 are bevel gears 112 driving shaft 113 carrying cams 114 and 115. Cam 114 actuates a guided rod 116 connected through link 117, lever 118, link 119, bell crank lever 120 and link 121 to guided push rod 122. The push rod 122 is arranged to contact cross-head 70 fixed on rods 69 slidably supported in carriage 26, when the spider arm 23 is at position to engage fruit carried by the impaling blade 65. Similar mechanism is provided on the opposite side of the machine to simultaneously operate the cross head 70 of the opposed cup assembly 67.

Cam 115, through guided rod 123, link 124, lever 125, link 126, bell crank lever 127, link 128, guided push rod 129, contacts cross head 70 when one of the spider arms 23 is at the pitting position. Similar mechanism is provided on the opposite side of the machine to simultaneously contact the cross head 70 of the opposed cup assembly 67.

The actions of the suction cups 30 in gripping, holding and releasing the fruit are controlled by rotary valvular means 130, which are respectively associated with the suction cups 30 on the oppositely aligned spider arms 23.

Each rotary valvular means 130 comprises a fixed annular manifold 131 connected at 132 to the vacuum pump 18 and disposed concentrically about a fixed or stationary valve housing 133 in which are three vacuum ports 134 spaced axially apart and disposed at equal angular intervals, and connected with the annular manifold 131 by radially disposed tubular branches 135.

Also formed in the valve housing 133 are three air ports 136 in constant communication with the atmosphere. The air ports 136 are spaced axially apart from the vacuum ports 134, and each air port is angularly separated from and cooperates with one of the vacuum ports, as presently described.

In each valve housing 133 is a rotary valve 137 which is intermittently rotated by the Geneva drive 19 through arcual distances of 120 degrees concurrently with the successive angular displacements of the spider arms 23 through the same angular interval.

In the rotary valve 137 there are three radial ports 138 which are positioned respectively in the same transverse planes as the three vacuum ports 134, and as the valve rotates the former ports 138 connect successively with the latter ports 134.

The rotary valve 137 is mounted upon the main shaft 20 wherein are formed three axial passages 139 which connect with the radial ports 138 and also with radial passages 140 formed in the main shaft and the hub 141 of spider 22 and connected through nipples 142 to flexible tubes 143 whereby the valvular means 130 is connected with the chambers 89 previously referred to.

Figure 5:
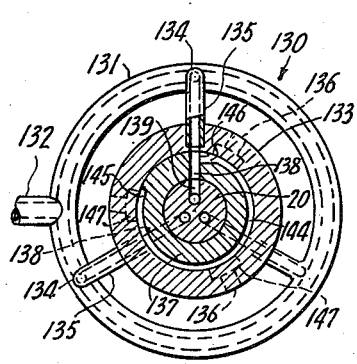
Fig. 5 is a transverse section on line 5—5 of Fig. 4.
Figure 3:
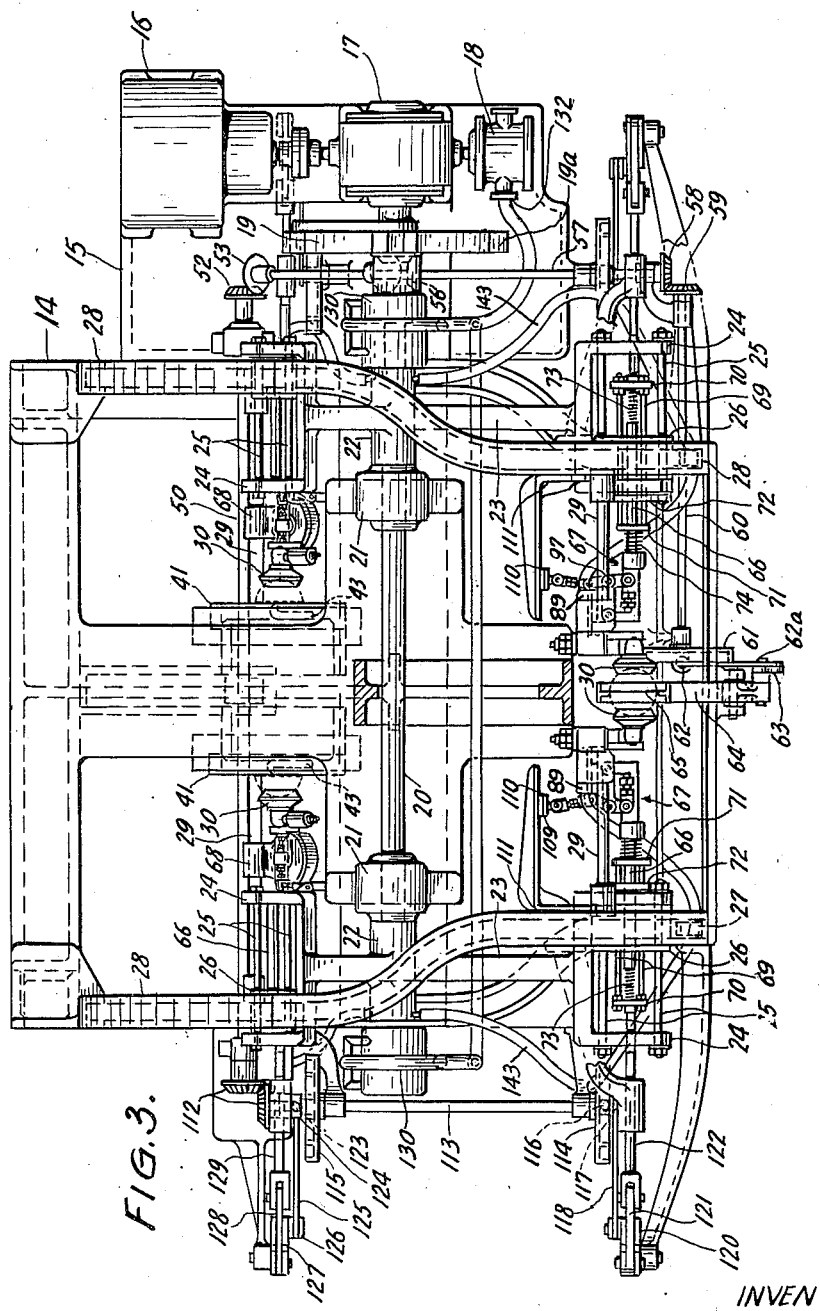
Fig. 3 is a plan view with saw mechanism omitted.

Formed in the periphery of the rotary valve 137 and associated respectively with the three radial ports 138 are circumferential grooves 144 which extend, as shown around the major portion of the periphery of the valve (see Fig. 5).

The circumferential grooves 144 lie in the same planes as the vacuum ports 134 and the radial ports 138, and it will be understood that as the rotary valve 137 rotates the circumferential grooves 144 in moving past the vacuum ports 134 connect the latter with the radial ports 138, the axial passages 139 and radial passages 140 and by way of the flexible tubes 143 with the chambers 89.

It will be further understood that this connection of said chamber 89 with the vacuum ports 134 is maintained during the complete movement of the circumferential grooves 144 past the said vacuum ports, corresponding to the period commencing with the alignment of the leading ends 145 of the grooves 144 with the vacuum ports 134 and the departure of the trailing ends 146 of said grooves from said vacuum ports.

Also formed in the periphery of the rotary valve 137 are longitudinal grooves 147 which connect with the circumferential grooves 144 and radial ports 138, and as the rotary valve 137 is angularly displaced the longitudinal grooves connect with the air ports 136 at a certain point of the rotation of said valve for the purpose of breaking down the vacuum in the chamber 89, as hereinafter described.

In the operation of the machine the operator places in the above described manner, a peach on the impaling blade 65 which as previously mentioned carries the peach into a pick-up position.

Simultaneously a pair of oppositely disposed suction cup assemblies 67 move to and stop at the pick-up position wherein the cup assemblies are in readiness to be advanced to engage the suction cups 30 with the peach.

For simplicity in explanation of the operation the description will be confined to one cup assembly and subsequent operational movements thereof, it being apparent that similar operations are simultaneously occurring in the opposed coacting cup assembly.

At the pick-up position push rod 122 is moved to contact cross head 70 and thrust the latter and the rods 69 inwardly, the latter sliding through the carriage 26 which at the pick-up position is located adjacently to the inner limb of the forked end 24.

The inward movement of the rods 69 thrust the plate 71 against spring 74 which presses the cup assembly 67 inwardly. This inward movement engages the suction cup 30 with one side of the peach. It will be understood that the opposite cup 30 engages the opposite side of said peach.

As illustrated in Figs. 12 and 13 engagement of the cups 30 with peaches of various sizes are shown and in which is diagrammatically illustrated the engagement movement of said cups on contact with the peach.

It is necessary that the cup assembly be yieldably mounted so that the cups 30 may engage various sizes of peaches, while permitting the push rod 122 to complete its full movement.

This is provided for by means of springs 73 and 74 which upon engagement of the cups 30 with the peach are compressed by the further inward movement of the push rod.

The movement of the cups 30 about the horizontal and vertical axes of the stems 87 and 79 permit said cups to correctly seat upon the peach on contacting the surface thereof (see Figs. 12 and 13). This movement is permitted by rotation of the stems 79 and 87 in the respective sleeves 80 and 88.

Prior to the engagement of the cups 30 with a peach, communication is effected between the cup 30 and the source of vacuum 18 by the groove 144 in the rotary valve 137 so that air is being drawn into the cup.

After the mouth 75 has been closed by the sealing engagement of the rubber lining 75 with the surface of the peach the inflow of air ceases and the resultant vacuum in the mouth 75 effects a firm hold on the peach. As the peach is thus gripped the resultant vacuum causes the diaphragm 93 to be drawn inwardly of the vacuum chamber 89, thus imparting motion by the stem 95 to the three armed lever 97 which effects engagement of the brake shoes 104 with hemi-spherical boss 78 and brake shoe 105 with cylindrical portion 106 to thereby lock the cup 30 against displacement during subsequent movement. Simultaneously the brake shoe 109 engages abutment 110 to prevent displacement of the cup assembly 67 relatively to the carriage 26.

On the peach being securely held by the pair of opposed cups 30 the Geneva drive 19 actuates the main shaft 20 to move the spider arms 23 carrying the opposed cup assemblies 67 holding the peach, to the next position. During this movement of the arms 23 the peach is moved past the saws 37 and 38 which sever the peach into two portions. After the peach is severed the cam tracks 28, by the rollers 27 slide the carriages 26 to separate the cup assemblies 67 and with them the severed portions of the peach.

The brake shoe 109 retains the natural suture plane of a fruit during transport from the pickup station to the saws 37 and 38. It is desirable to halve the fruit in its natural suture plane, and it is assumed that the fruit was previously impaled on the blade 65 with its suture plane coincident with the plane of the blade, as above described.

The natural suture plane, however, is by no means always symmetrical with the exterior surface of the fruit. Resultantly, the cup assemblies 67 on either side of the fruit will take up a medium position and the springs 73 and 74 will float, the two opposed cups being attached by suction to the fruit which at this stage is still whole.

If one half of the fruit relatively to the suture, is smaller than the other, the suture might not remain in the plane of the impaling knife and the slitting saws, the latter and the former being coplanar.

It will be apparent that the correct positioning of the suture is maintained by the action of the brake shoes 109, which lock each cup assembly exactly and automatically in the pick-up position, thereby maintaining the natural suture in the plane of the impaling blade for the subsequent sawing and pitting operations.

Under the influence of the curve in cam tracks 28 the two peach halves slide into pitting position flush with the top of the pitting table, and the cam-controlled action of the rods 129 serves as an additional security to hold the fruit firmly down on to the pitting table, to resist the action of the pitting knife which exerts a very considerable dislocating force upon the fruit half. Upon the fruit being discharged by breaking of the vacuum, the brake shoe 109 is also automatically released and resultantly the spring 73 retracts the whole cup assembly outwardly, as is necessary to permit the cups to slide into the picking-up position without, for instance, interference with a very large fruit carried upon the impaling blade.

The retraction of the cup assemblies into the outer positions is the main purpose of the springs 73. When picking-up takes place the springs 73 do not actively participate as the springs 74 provide the axial yielding required by various sizes of fruit, except in the case of the picking-up of an abnormally large fruit when both springs will be compressed.

Upon the suction being broken, the fruit discharged and the brake shoe 109 released, the springs 73 retract the whole cup assemblies outwardly to a position wherein both springs 73 and 74 are expanded, the cups 30 are clear of the largest fruit possible and the cross-heads 70 clear of the inner end of the outwardly retracted rods 122.

The separated portions of the peach are then carried by the continued movement of the arms 23 to the pitting position. At this position push rod 129 moves the cross head 70 as previously described to effect engagement of the peach portions with the pitting tables 41 whereupon the pitting knives 43 are actuated to sever the pit halves from the peach flesh.

Upon completion of the pitting operation the Geneva drive 19 moves the arms 23 to the pick-up position. During this movement the circumferential groove 144 in the rotary valve 137 is connected by longitudinal groove 147 with the air port 136, thereby breaking the vacuum in the cup 30 so that the pitted peach portion is released for discharge.

It will be understood that a fruit impaled upon the blade 65 with the stone positioned thereon as described, is transferred to the pick-up position and engaged by the suction cups and locked thereby with the stone properly located for halving in the suture plane by the slitting saws and removal of the halved stones by the pitting blades.

Upon continued movement of the rotary valve 137 and the spider arm 23, the circumferential groove 144 again connects with the vacuum port 134, thereby connecting the mouth 75 of the suction cup 30 with the pump 18 and by means of the cam track 28 and roller 29 the carriage 26 is moved inwardly to return the cup assembly 67 to its initial position at the pick-up position.

In lieu of operating the brakes by suction as previously described, for maintaining the suction cups in self adjusted position it will be apparent that the brakes could be operated by a solenoid in circuit with a switch operated by a peach seating in the cup. In this case release of the peach by breaking the vacuum would open the switch controlling the solenoid, thereby releasing the brakes.

I claim:

1. In a mechanism for holding fruit for processing in a fruit pitting machine; at least one pair of opposedly aligned coacting suction cups for the fruit, each cup being mounted for angular movement and having automatically operable means for maintaining the cup in the adjusted angular position and an articulated support for each suction cup, said support comprising a supporting member, a member having limbs disposed at right angles to the supporting member, a stem on the suction cup rotatably mounted in one of the limbs, a stem integral with the other limb and journaled in the supporting member, the axes of the stems being located in planes intersecting at right angles on the axis of the suction cup.

2. In a mechanism for holding fruit for processing in a fruit pitting machine having a vacuum source; at least one pair of opposedly aligned coacting suction cups for the fruit, each cup being mounted for angular movement and having automatically operable means for maintaining the cup in the adjusted angular position, and an articulated support for each suction cup, said support comprising a supporting member, a member having limbs disposed at right angles to the supporting member, a stem on the suction cup rotatably mounted in one of the limbs, a stem integral with the other limb and journaled in the supporting member, the axes of the stems being located in planes intersecting at right angles the axis of the suction cup, the stems and right angular member having passages connecting the suction cup with a vacuum source, the supporting member having a chamber formed therein communicating with the passages, braking means engageable with the articulated support coacting with the suction cup, and means actuating the braking means associated with the chamber movable in response to the creation of a vacuum in the passages and chamber.

ARNOLD BESAG.

REFERENCES CITED

The following references are of record in the file of this patent:

UNITED STATES PATENTS

| Number | Name | Date |
|---|---|---|
| 1,304,892 | Leefeld | May 27, 1919 |
| 1,403,852 | Ensele | Jan. 17, 1922 |
| 1,490,493 | Tenney | Apr. 15, 1924 |
| 1,503,390 | Tenney | July 29, 1924 |
| 2,040,114 | Watkins | May 12, 1936 |
| 2,147,870 | Watkins | Feb. 21, 1939 |
| 2,177,967 | Watkins | Oct. 31, 1939 |
| 2,444,298 | Kline | June 29, 1948 |